United States Patent
Mair et al.

(10) Patent No.: US 9,555,805 B2
(45) Date of Patent: Jan. 31, 2017

(54) METHOD FOR FREEING A VEHICLE BY ROCKING WHEN THE VEHICLE GOT STUCK

(71) Applicant: ZF Friedrichshafen AG, Friedrichshafen (DE)

(72) Inventors: Roland Mair, Tettnang (DE); Marcus Haug, Friedrichshafen (DE); Florian Schneider, Lindenberg im Allgäu (DE); Andreas Heinzler, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/684,554

(22) Filed: Apr. 13, 2015

(65) Prior Publication Data

US 2015/0291168 A1 Oct. 15, 2015

(30) Foreign Application Priority Data

Apr. 14, 2014 (DE) .......................... 10 2014 207 087

(51) Int. Cl.
*G05D 1/00* (2006.01)
*G06D 3/00* (2006.01)
(Continued)

(52) U.S. Cl.
CPC .. *B60W 30/18045* (2013.01); *B60W 2510/188* (2013.01); *B60W 2520/10* (2013.01); *B60W 2540/103* (2013.01); *F16H 59/12* (2013.01)

(58) Field of Classification Search
CPC .......................... B60W 30/18045; F16H 59/12
(Continued)

(56) References Cited

U.S. PATENT DOCUMENTS 7,302,333 B2 11/2007 Steen et al.
2006/0237249 A1* 10/2006 Steen .................. B60K 28/16
180/198
(Continued)

FOREIGN PATENT DOCUMENTS

DE 41 01 610 C1 8/1992
DE 101 05 749 A1 8/2002
(Continued)

OTHER PUBLICATIONS

German Search Report Corresponding to 10 2014 207 081.3 mailed Jan. 7, 2015.
(Continued)

*Primary Examiner* — Helal A Algahaim
*Assistant Examiner* — Mahmoud Ismail
(74) *Attorney, Agent, or Firm* — Davis & Bujold, PLLC; Michael J. Bujold

(57) ABSTRACT

A method of releasing a stuck vehicle, in which a stuck situation is recognized and a rocking-free process is initiated and continued until the rocking-free process is suppressed. The rocking-free process is suppressed either after the activation of a parking brake of the vehicle, which was inactive at the beginning of and during the rocking-free process, for a predetermined time interval, or after the registration of a limit value of a deflection of a drive pedal of the vehicle and after the limit value of the deflection of the drive pedal is maintained or exceeded for a predetermined time interval, or after a vehicle speed falls to almost zero km/h, a minimum actuation of a drive pedal of the vehicle is registered, the vehicle speed is maintained for a predetermined time interval and the minimum actuation is maintained for the predetermined time interval.

8 Claims, 2 Drawing Sheets

(51) Int. Cl.
  G06F 7/00 (2006.01)
  G06F 17/00 (2006.01)
  B60W 30/18 (2012.01)
  G06F 19/00 (2011.01)
  B60P 3/06 (2006.01)
  F16H 59/12 (2006.01)

(58) Field of Classification Search
  USPC .................................. 701/1, 65, 53; 180/198
  See application file for complete search history.

(56) References Cited

U.S. PATENT DOCUMENTS

| 2008/0204214 | A1  | 8/2008 | Reith et al. | |
|---|---|---|---|---|
| 2010/0075804 | A1* | 3/2010 | Ryberg | F16D 48/08 477/174 |
| 2011/0066341 | A1* | 3/2011 | Ohtsu | B60W 10/06 701/65 |
| 2012/0095657 | A1* | 4/2012 | Pudvay | F16H 59/12 701/53 |

FOREIGN PATENT DOCUMENTS

| DE | 101 09 662 A1 | 9/2002 |
|---|---|---|
| DE | 101 28 853 A1 | 12/2002 |
| DE | 10 2004 017 422 A1 | 10/2005 |
| DE | 10 2005 023 246 A1 | 11/2006 |
| DE | 10 2005 023 247 A1 | 11/2006 |
| DE | 10 2006 034 411 A1 | 1/2008 |
| DE | 60 2004 012 248 T2 | 3/2009 |
| DE | 10 2009 036 058 A1 | 2/2011 |
| DE | 10 2009 053 267 A1 | 5/2011 |
| DE | 10 2010 043 250 A1 | 5/2012 |
| DE | 11 2010 002 845 T5 | 11/2012 |
| DE | 10 2011 118 551 A1 | 5/2013 |
| WO | 2008/012160 A1 | 1/2008 |

OTHER PUBLICATIONS

German Search Report Corresponding to 10 2014 207 082.1 mailed Jan. 7, 2015.

German Office Action Corresponding to 10 2014 207 087.2 mailed Jan. 7, 2015.

German Office Action Corresponding to 10 2014 207 088.0 mailed Jan. 7, 2015.

German Office Action Corresponding to 10 2014 207 117.8 mailed Jan. 7, 2015.

* cited by examiner

METHOD FOR FREEING A VEHICLE BY ROCKING WHEN THE VEHICLE GOT STUCK

This application claims priority from German patent application serial no. 10 2014 207 087.2 filed Apr. 14, 2014.

FIELD OF THE INVENTION

The invention concerns a method for releasing a vehicle that is stuck, by means of a rocking-free process.

BACKGROUND OF THE INVENTION

In certain weather conditions or poor road conditions it is possible for a vehicle to become stuck, for example in a depression or on slippery subsoil, so that the stuck position can no longer be left by driving off in a conventional manner. By starting off toward the obstacle, then disengaging the clutch, allowing the vehicle to roll back, and then repeating the procedure, a driver with a manual-shift vehicle can build up momentum and release the vehicle. This process is known a rocking free. For vehicles having an automatic transmission, an automated transmission or a multiple-clutch transmission the method described above can only be used in some circumstances. Such vehicles are therefore often provided with an automatic method for rocking free, which enables the vehicle to be released from its stuck position.

The rocking-free process is either initiated by a driver, or automatically started in accordance with previously stored criteria such as a large difference between the speeds of the individual wheels. The driver can often activate the automatic initiation of the rocking-free process by means of a switch or by actuating a key, so that the rocking-free process is only started when the driver so wishes. Once the vehicle has been released the rocking-free process is terminated, for example by actuating the switch or key again.

DE 10 2004 017 422 A1 describes a method for implementing a rocking-free function, which, in order to initiate the rocking-free process, evaluates the wheel rotational speeds of the driven wheels of a vehicle. From that, the traction capacity of the corresponding wheels is estimated. Furthermore, among other things, information about rotational direction and inclination is used in order to optimize the rocking-free process. The rocking-free function can either be activated when a driver of the vehicle actuates a switch or key, or by a command from the on-board computer. Likewise an actuation is disclosed, which after registering that the vehicle is stuck, proceeds automatically or after questioning the driver. The rocking-free process is terminated when the driver actuates the switch or key, or automatically if vehicle-internal systems register that the vehicle is moving in one direction or over a fixed distance for a longer time. It is also disclosed that in vehicles having a distance-warning system, it is tested whether sufficient free areas are around the vehicle concerned, to carry out the rocking free. If this is not the case, the rocking-free process is suppressed.

DE 101 28 853 A1 describes a method for rocking free and/or maneuvering a vehicle with a multiple-clutch transmission, in which the rocking-free process can only be started when the clutch arrangement is in a disengaged condition and/or the vehicle concerned is at rest. In addition it is disclosed that this special transmission condition can be produced by a driver of the vehicle by means of an operating arrangement which, for example, can consist of two switches or an operating lever. The vehicle's shift lever can also serve as the operating lever. The rocking-free process is initiated when the wheel-slip of the vehicle's driven wheels or the force acting in opposition to the drive torque of the vehicle exceed a predetermined limit value or when the vehicle's speed falls below a set limit value. A rocking-free period ends when the vehicle comes to a standstill, or when the wheel-slip becomes too great.

DE 101 09 662 B4 describes a method for controlling a dual-clutch transmission, in which a direction-change mode, which is comparable to a rocking-free process, can indirectly be triggered by the driver. The direction-change mode ends automatically. As an interruption criterion the actuation of a brake pedal is used, which lasts for a predetermined time and beyond that predetermined time. Likewise the direction-change mode ends if a brake pedal actuation would lead to a predetermined brake pressure and/or to a predetermined braking force. Furthermore, the direction-change mode can also be terminated by actuating a drive pedal for up to or longer than a predetermined time, and/or which reaches or exceeds a predetermined limit value of the pedal movement. A termination of the direction-change mode due to the movement of the vehicle for a predetermined time in one direction and/or over a predetermined distance is also disclosed.

Furthermore, vehicles with an automated transmission are also known, which have a rocking-free function. An implemented rocking-free process is activated by a driver by means of a key and the simultaneous engagement of the first or second reverse gear, or by engaging the first to the eighth forward gear while at the same time driving more slowly than a speed of 5 km/h. The rocking-free function is deactivated either if the driver actuates the key again, or by driving at a speed above or equal to 8 km/h.

For example, if a vehicle has become stuck on muddy ground and a rocking-free function is started in order to release the vehicle, it can happen after a successful release of the vehicle that the rocking-free function is not terminated. For example, the driver of the vehicle can forget to switch off the rocking-free function by actuating the switch or key. The result is that each time the vehicle starts off a rocking-free function is initiated. This makes starting uncomfortable for the driver and can lead to accidents. The same situation arises when speed or distance limits are chosen too high or determined erroneously. It is therefore appropriate to establish further criteria that bring about a suppression of the rocking-free process, so that the rocking-free function is carried out safely by virtue of the automatic suppression.

SUMMARY OF THE INVENTION

The purpose of the present invention is to provide an improved method for releasing a stuck vehicle, which by implementing an automatic suppression on the basis of pre-established criteria prevents erroneous operation by a driver and prevents the continuation of the rocking-free process after the vehicle has already been released successfully. This allows the driver, once the vehicle has been released, to drive on comfortably even if he has forgotten to actively terminate the rocking-free function.

Starting from the prior art described at the beginning, the present invention proposes a method for releasing a stuck vehicle, in which method the sticking of the vehicle is detected, a rocking-free process is initiated and the process is continued until it is automatically suppressed.

A vehicle is considered to be stuck when it is in a position in which a driver cannot move the vehicle starting from the position in a desired direction, because the wheel-slip of one or more vehicle wheels is too severe, i.e. the static friction of the wheels is too low because of the condition of the subsoil.

If the wheel-slip of the vehicle is detected by sensors and evaluated, for example by evaluating the speeds of the individual wheels compared with one another, appropriate software can deduce a stuck situation and automatically initiate a rocking-free process. Alternatively the driver may perceive that the vehicle is stuck and therefore initiate the rocking-free process.

In this context a rocking-free process is defined as a process for releasing a vehicle from a stuck position. During this the vehicle is first moved in a desired travel direction until a reversal point is reached. At that point there is a force equilibrium between a drive torque and a force opposing the drive torque, so that the vehicle cannot be moved beyond the point. When the reversal point is reached, the vehicle is moved in the direction opposite to the desired travel direction until another reversal point is reached, at which there is again a force equilibrium. The vehicle is then again moved in the desired travel direction until a further reversal point is reached. This reversal point is farther away from the starting position than the first reversal point. That process of rocking to and fro can be repeated as many times as necessary for the vehicle to be released from the stuck position when the drive torque of the vehicle is large enough to move the vehicle in the desired travel direction. In other words, the vehicle has then gone beyond the point of force equilibrium, i.e. an escape point from the stuck situation is opposite the previous reversal point. The movement of the vehicle in the direction opposite to the desired travel direction can take place either actively by an acceleration process, or passively for example by virtue of rolling back under gravity.

The rocking-free process is continued until it is suppressed. This means that the rocking-free process is stopped either when it has been taking place for a long time, for example after a successful release of the vehicle, or directly after its initiation, i.e. after a very short time, when the rocking-free process has only been operating for a fraction of a second.

The suppression of the rocking-free process takes place automatically. Here, 'automatically' means that when predetermined, vehicle-specific conditions arise, the rocking-free process can be suppressed automatically by vehicle-internal processes.

A first embodiment variant of the method according to the invention is characterized in that the rocking-free process is suppressed after the activation of a parking brake of the vehicle that has been inactive for a predetermined time interval at the beginning of and during the rocking-free process.

In this case the predetermined time interval is defined as a time interval limited by a time interval start value and a time interval end value. The time interval between the time start and time end values is the predetermined time interval. Depending on the type of vehicle, the predetermined time interval can be chosen individually, and even a predetermined time interval of zero seconds can be possible. If the predetermined time interval is the minimum chosen, the rocking-free process is suppressed automatically by vehicle-internal processes as soon as the predefined, vehicle-specific conditions occur.

Before the rocking-free process is activated the parking brake is at first inactive, i.e. the parking brake can still be actuated. When the rocking-free process is activated the parking brake first remains in that condition for the predetermined time interval. If the parking brake is activated, i.e. actuated after the lapse of the predetermined time interval during the rocking-free process, the rocking-free process is stopped. In addition or alternatively, if a previously described condition change of the parking brake occurs, the starting of a rocking-free process sequence is blocked. In other words the rocking-free process can be terminated again immediately, for example if required by the driver. The block can last until the parking brake is inactivated again. The condition of the parking brake is registered and evaluated by vehicle-internal sensors, in such manner that not only the actual condition at the time is registered but also the previous condition is stored and evaluated along with it. In this way a change in the condition of the parking brake can be determined.

According to another embodiment variant of the method according to the invention, the rocking-free process is suppressed after the detection of a limit value of a deflection of a drive pedal of the vehicle, if the limit value of the drive pedal's deflection limit is maintained or exceeded for a predetermined time interval.

The drive pedal is defined as a pedal that can be actuated directly or indirectly by the driver of the vehicle, such that the drive pedal influences the driving behavior of the vehicle by controlling established functions. The drive pedal can for example be a throttle control or even a brake pedal of the vehicle.

In this context the deflection of the drive pedal is defined as a position in space that the drive pedal adopts by virtue of a pressure force acting on it. The drive pedal is mounted so that it can move along a guide by the action of pressure, from an initial position in which no force is acting on the drive pedal and which is known as the minimum actuation, to a position of maximum deflection known as the maximum actuation and in which the drive pedal is acted upon by a pressure force. In the maximum actuation position the driver cannot actuate the drive pedal any farther. Between the minimum actuation and the maximum actuation the drive pedal can move to any position along the guide, and depending on the type of vehicle and guide, the path followed by the drive pedal may be a straight line or a curve.

The limit value of the deflection of the drive pedal can be set individually for each vehicle type, this limit value being chosen such that usual drive pedal deflections that occur during a rocking-free process are below the limit value, so that an inadvertent suppression of the rocking-free process can be prevented. For example, the maximum actuation of the drive pedal can be used as a limit value.

Before the rocking-free process is activated the drive pedal is in its starting position. When the rocking-free process is activated, if during this the deflection of the drive pedal reaches the limit value and maintains or exceeds it for the predetermined time interval, the rocking-free process is stopped. Depending on the type of vehicle the predetermined time interval can be set individually, and even a minimum predetermined time of zero seconds can be possible. In addition or alternatively, if the limit value of the deflection of the drive pedal is maintained or exceeded as described above, a start of the rocking-free process is blocked. In other words the rocking-free process can be terminated immediately again, for example if the driver so requires. The block can last until the deflection of the drive pedal reverts to below the limit value.

The existing deflection of the drive pedal is registered and evaluated by vehicle-internal sensors, in such manner that not only the actual deflection at the time but also the previous deflection is stored and evaluated with it. Alternatively, only an occurrence of the limit value of the deflection may be detected and evaluated by sensors. This means that only when the limit value of the deflection of the drive pedal is reached, is a signal emitted, registered and evaluated.

In another embodiment variant of the method according to the invention, the rocking-free process is suppressed when a vehicle speed has fallen to almost zero km/h, a minimum actuation of a drive pedal is registered, the speed is maintained for a predetermined time interval, and the minimum actuation is also maintained for the predetermined time interval.

The fall of the vehicle's speed to almost zero km/h means that the vehicle is moving ahead at a speed approximating zero km/h until the vehicle comes to a standstill. In this case the vehicle can be actively braked, or it can coast. The vehicle's speed is in this case determined by the usual vehicle-internal sensors.

The minimum actuation of the vehicle's drive pedal is defined as a minimum possible deflection of the drive pedal from its initial position, i.e. the drive pedal can still be actuated by the driver all the way. Alternatively, the initial position of the drive pedal can already be its minimum actuation. The initial position of the drive pedal is defined as the position where the drive pedal is when no force is acting upon it.

Before the rocking-free process is activated the vehicle moves at a certain speed and the drive pedal is actuated, i.e. it is deflected to some extent. When the rocking-free process is activated and during it both the deflection of the drive pedal reaches the minimum actuation and also the vehicle's speed reaches almost zero km/h, and if this persists for the predetermined time interval, the rocking-free process is stopped. For this the predetermined time interval can be chosen individually according to vehicle type, and likewise, a minimum predetermined time interval of zero seconds is possible. In addition or alternatively, in the event of the previously described persistence of the minimum actuation of the drive pedal and of the vehicle's speed, starting of the rocking-free process sequence can be blocked. In other words, for example if the driver so requires, the rocking-free process can be terminated again immediately. The block can last until the deflection of the drive pedal reverts to above its minimum actuation and the speed increased to appreciably above zero km/h.

The actual deflection of the drive pedal is registered and evaluated by vehicle-internal sensors, in such manner that not only the actual deflection at the time, but also the previous deflection is stored and evaluated with it. Alternatively, only an occurrence of the minimum actuation of the drive pedal can be registered and evaluated. This means that only on reaching the minimum possible deflection is a signal emitted, registered and evaluated.

Further characteristics and advantages of the invention emerge from the following description of example embodiments of the invention, with reference to the figures and drawings which show details essential to the invention, and from the claims. In any embodiment variant of the invention the individual characteristics can be implemented individually as such, or more than one at a time, in any combination.

BRIEF DESCRIPTION OF THE DRAWINGS

Various example embodiments and details of the invention are described in more detail with reference to the figures explained below, which show.

DETAILED DESCRIPTION OF THE PREFERRED EMBODIMENTS

In the following description of example embodiments of the present invention, the same or similar indexes are used for the same or similar elements shown in the various figures, so that there is no need for detailed repetitive descriptions of the elements.

Figure 1:
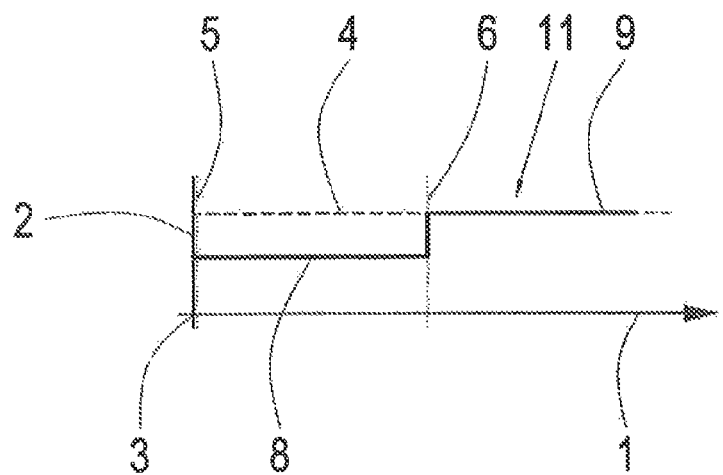
FIG. 1: A sequence function of a method for releasing a stuck vehicle, according to an example embodiment relating to a parking brake of the vehicle.

FIG. 1 shows a function sequence of a process for releasing a stuck vehicle according to an example embodiment that relates to a parking brake of the vehicle. The figure shows a coordinate system with an abscissa 1 and an ordinate 2 perpendicular thereto, with the abscissa and the ordinate intersecting at an origin 3. The abscissa is a time axis representing an increase of time in the positive direction. The origin 3 is a starting time-point at which a consideration of the function sequence begins, i.e. a zero-time point.

In the coordinate system defined by the abscissa 1 and the ordinate 2, a limit value 4 extends as a straight line, represented by a broken line parallel to and a distance away from the abscissa 1. The limit value 4 visualizes an activated condition of the parking brake of the vehicle to be released. In addition, in the coordinate system defined by the abscissa 1 and the ordinate 2, a time interval start value 5 extends as a straight line, indicated as a dotted line coincident with the ordinate 2. In the coordinate system defined by the abscissa 1 and the ordinate 2, a time interval end value 6, indicated as a straight, dotted line, extends parallel to and a distance away from the ordinate 2. An area between the time interval start value 5 and the time interval end value 6 is a time zone that represents a predetermined time interval.

In the coordinate system defined by the abscissa 1 and the ordinate 2, a function 11 has the shape of a jump function a distance away from the abscissa 1 and very substantially parallel to it. The function 11 is divided into two parts 8, 9, which merge one into the other in the form of a rising step. A first function section 8 is a straight section a distance away from the abscissa 1 and from the limit value 4 in the coordinate system defined by the abscissa 1 and the ordinate 2. This first function section extends closer to the abscissa 1 than to the limit value 4, and represents an inactivated condition of the parking brake of the vehicle to be released. A second function section 9 is a straight section extending in a straight line a distance away from the abscissa 1 and the limit value 4 in the coordinate system defined by the abscissa 1 and the ordinate 2. The second function section 9, and also the limit value 4, represent activated conditions of the parking brake. Thus, the function 11 pictures the condition of the parking brake. The step-shaped transition between the first function section 8 and the second function section 9 marks the time interval end value 6.

The release of the vehicle by means of a rocking-free process begins at the starting time-point, characterized by the origin 3. At that time-point the parking brake of the vehicle is inactivated, as shown by the first function section 8. The starting time-point defines the time interval start value 5, when the predetermined time interval begins. The rocking-free process continues until the parking brake is activated, i.e. until the function 11 changes from the first function section 8 to the second function section 9. The time interval end value 6 is defined by that transition. If the parking brake remains inactivated throughout the predetermined time interval, then from the time interval end value 6 onward the rocking-free process is suppressed.

Figure 2:
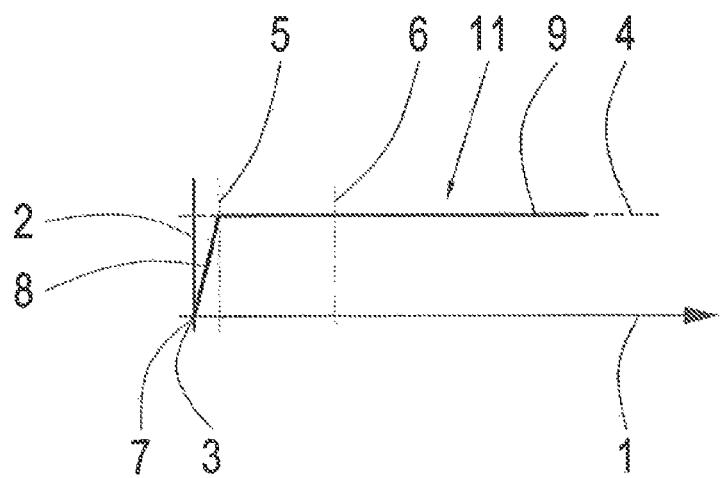
FIG. 2: A sequence function of a method for releasing a stuck vehicle, according to an example embodiment relating to a drive pedal of the vehicle.

FIG. 2 shows a function sequence of a method for releasing a stuck vehicle, according to an example embodiment relating to a drive pedal of the vehicle. As in FIG. 1 a coordinate system is shown, with an abscissa 1 and an ordinate 2, the abscissa 1 and the ordinate 2 intersecting at the origin 3. As in FIG. 1 the abscissa 1 is the time axis whose positive direction represents increasing time. The ordinate 2 represents a deflection of the drive pedal of the vehicle to be released, which increases the farther away a point is from the origin 3 in a positive direction on the ordinate 2. The origin is both the starting time-point as in FIG. 1, and also the starting position of the drive pedal, i.e. the zero-value of the ordinate 2.

In the coordinate system defined by the abscissa 1 and the ordinate 2, a limit value 4 extends as a straight line parallel to and a distance away from the abscissa 1. The limit value represents a maximum deflection, i.e. a maximum actuation of the drive pedal of the vehicle to be released. In addition, in the coordinate system defined by the abscissa 1 and the ordinate 2, a time interval start value 5 extends as a straight line, indicated as a dotted line, parallel to and a distance from the ordinate 2. In the coordinate system defined by the abscissa 1 and the ordinate 2, a time interval end value 6, indicated as a dotted line, also extends parallel to and a distance from the ordinate 2, the time interval end value 6 being a distance away from the time interval start value 5 with the latter closer to the ordinate 2 than the time interval end value 6. An area between the time interval start value 5 and end value 6 is a time zone that represents a predetermined time interval.

In the coordinate system defined by the abscissa 1 and the ordinate 2, a function 11 adopts the form of a ramp. The function 11 is divided into two sections 8, 9 which merge the one into the other. A first function section 8 extends in the shape of a straight ramp rising from the origin 3 toward the limit value 4 until the latter is reached. The first function section 8 intersects the origin at a point 7. The first function section 8 represents the linear increase of the drive pedal's deflection from its initial position up to the maximum actuation. A second function section 9 follows on from the first function section 8 and extends as a straight section parallel to and a distance away from the abscissa 1, coincident with the limit value 4. This transition between the first function section 8 and the second function section 9 marks the time interval start value 5. Thus, the function 11 represents the change with time of the deflection of the drive pedal of the vehicle to be released.

The release of the vehicle by means of a rocking-free process begins at the start time represented by the origin 3. At that point in time the drive pedal is in its starting position, as shown by the intersection point of the first function section 8 with the origin 3. During the rocking-free process taking place the deflection of the drive pedal increases linearly with the passage of time, as shown by the first function section 8, until the maximum actuation, represented by the second function section 9, is reached. At the transition between the first function section 8 and the second function section 9, the deflection of the drive pedal reaches the limit value 4. At that transition the time interval start value 5 is set and the predetermined time interval runs until the time interval end value 6. If the maximum actuation of the drive pedal of the vehicle to be released is maintained for the predetermined time interval, then the rocking-free process is suppressed from the time interval end value 6.

Figure 3:
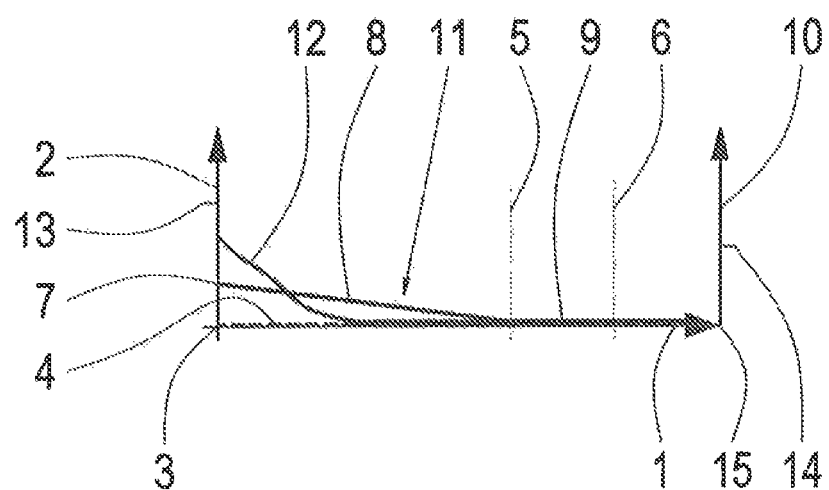
FIG. 3: A sequence function of a method for releasing a stuck vehicle, according to an example embodiment relating to a drive pedal of the vehicle and a vehicle speed.

FIG. 3 shows a function sequence of a method for releasing a stuck vehicle, according to an example embodiment which relates to a drive pedal of the vehicle and to a speed of the vehicle. A coordinate system is shown, which has an abscissa 1, an ordinate 2 and a further ordinate 10, wherein the abscissa 1 and the ordinate 2 intersect at an origin 3 as in FIG. 1. The ordinate 2 is perpendicular to the abscissa 1, as already described for FIG. 1. The further ordinate 10 is also perpendicular to the abscissa 1 and intersects it at a starting point 15. The starting point is located at the right-hand end of the abscissa 1 as seen by a person looking at the figure. As in FIG. 1, the abscissa 1 represents the time axis, which shows time increasing in the positive direction. The ordinate 2 represents a deflection of the drive pedal of the vehicle to be released, which deflection increases the farther away a point is along the ordinate 2 from the origin 3 in a positive direction. The origin 3 is both the starting time-point as in FIG. 2, and also represents the absence of any deflection of the drive pedal of the vehicle to be released, i.e. a zero value. The further ordinate 10 represents the travel speed of the vehicle to be released, which increases the farther a point is away from the starting point 15 in a positive direction along the further ordinate 10. The starting point 15 indicates a standstill of the vehicle, i.e. that its speed is zero.

A limit value 4 extends as a straight line along the abscissa 1 in the coordinate system defined by the abscissa 1, the ordinate 2 and the further ordinate 10. The limit value 4 represents both the standstill of the vehicle to be released and also the absence of any deflection of the vehicle's drive pedal. In addition, in the coordinate system defined by the abscissa 1, the ordinate 2 and the further ordinate 10, a time interval start value 5 extends as a straight line, shown as a dotted line, parallel to and a distance away from the ordinate 2. A time interval end value 6, again shown as a dotted line, also extends in the coordinate system defined by the abscissa 1, the ordinate 2 and the further ordinate 10, as a straight line parallel to and a distance away from the ordinate 2, with the time interval end value 6 a distance away from the time interval start value 5. The time interval start value 5 is closer to the ordinate 2 than is the time interval end value 6. An area between the time interval start 5 value and end 6 value is a time zone that represents a predetermined time interval.

An end value 13 lies on the ordinate 2 a distance away from the origin 3 and represents a maximum possible deflection of the drive pedal of the vehicle to be released. A point of intersection 7 is also located on the ordinate 2 a distance away from the origin 3, this point of intersection being closer to the origin 3 than is the end value 13. The intersection point 7 represents a value of the deflection of the drive pedal between a maximum deflection and the absence of any deflection at the starting point. In the coordinate system defined by the abscissa 1, the ordinate 2 and the further ordinate 10, a function 11 has the form of a ramp. The function 11 is divided into two sections 8, 9, the one merging into the other. A first function section 8 extends in the form of a straight line section as a downward ramp starting from the intersection point 7 toward the abscissa 1. This first function section 8 represents the linear reduction of the deflection of the drive pedal from a deflection value represented by the intersection point 7 until there is no longer any deflection. A second function section 9 follows on from the first function section 8 and is in the form of a straight section on the abscissa 1 and thus at the limit value 4. This transition between the first 8 and the second 9 function sections marks the time interval start value 5. Thus, the function 11 shows the change over time of the deflection of the drive pedal of the vehicle to be released.

A further intersection point 14 is located on the further ordinate 10 a distance away from the starting point 15. This further intersection point 14 represents a certain vehicle speed that the vehicle to be released has at the starting time-point. In the coordinate system defined by the abscissa 1, the ordinate 2 and the further ordinate 10, a further function 12 extends in the form of a decreasing function. Starting from a maximum value indicated by the further intersection point 14, the further function 12 first approaches the abscissa 1 asymptotically and reaches it with increasing time. Thus, the further function 12 represents the decrease of the vehicle speed of the vehicle to be released until it comes to a standstill.

The release of the vehicle by a rocking-free process begins at the starting time-point, which is characterized by the origin 3. At that point in time the drive pedal is deflected by a certain amount, represented by the intersection point 7 of the first function section 8, and the vehicle is moving at a certain speed, represented by the further intersection point 14. During the rocking-free process taking place the deflection of the drive pedal decreases linearly as time passes, as shown by the first function section 8, until the drive pedal is no longer deflected at all, as represented by the second function section 9. At the transition between the first function section 8 and the second function section 9 the deflection of the drive pedal reaches the limit value 4. With increasing time the vehicle speed also decreases, as shown by the further function 12, until the vehicle comes to a standstill. Thus, the further function too reaches the limit value 4. At the transition between the first function section 8 and the second function section 9 the time interval start value 5 is set and the predetermined time interval runs until the time interval end value 6. If the deflection of the drive pedal and the standstill of the vehicle to be released continue through the predetermined time interval, the rocking-free process is suppressed from the time interval end value 6 onward.

The example embodiments described and illustrated in the figures are only chosen as examples. For instance, in FIG. 2, instead of the maximum actuation, i.e. the maximum possible deflection of the drive pedal, a predetermined deflection of the drive pedal can serve as the limit value so that the rocking-free process is suppressed if that limit value is reached and maintained or exceeded. For example, the limit value of the vehicle's speed shown in FIG. 3 can be a speed that corresponds almost to zero km/h. For example, a minimal actuation of the drive pedal is also possible as a limit value in FIG. 3, i.e. a detectable minimum deflection. For example, the time interval start value can coincide with the time interval end value, so that the predetermined time interval is zero seconds.

Different example embodiments be combined with one another completely and as regards individual features. In addition, one example embodiment can be supplemented by one or more features of another example embodiment.

INDEXES

1 Abscissa
2 Ordinate
3 Origin
4 Limit value
5 Time interval start value
6 Time interval end value
7 Intersection point
8 First function section
9 Second function section
10 Further ordinate
11 Function
12 Further function
13 End value
14 Further intersection point
15 Starting point

The invention claimed is:

1. A method of operation a motor vehicle and releasing the motor vehicle from a stuck situation, the method comprising:
   recognizing the stuck situation of the motor vehicle by at least one sensor;
   initiating, upon recognition of the stuck situation of the motor vehicle, a rocking-free process;
   continuing the rocking free process until the rocking-free process is automatically suppressed;
   automatically suppressing the rocking-free process after detecting activation of a throttle control of the motor vehicle which was inactive at the initiation of and during the rocking-free process, for a predetermined time interval; and
   continuing suppression of the rocking-free process for a predetermined time interval in order to prevent the continuation of the rocking-free process after the motor vehicle is successfully released from the stuck situation despite any continued erroneous activation of the rocking-free process by a driver.

2. A method of releasing a vehicle from a stuck situation, the method comprising:
   recognizing the stuck situation of the vehicle by at least one sensor;
   initiating a rocking-free process, upon recognition of the stuck situation of the vehicle and continuing the rocking-free process until the rocking free process is suppressed;
   automatically suppressing the rocking-free process after:
      registering a limit value of a deflection of a throttle control of the vehicle,
      noting and evaluating the limit value of the deflection of the throttle control of the vehicle; and
      maintaining or exceeding the limit value of the deflection of the throttle control for a predetermined time interval; and
   continuing suppression of the rocking-free process for a predetermined time interval in order to prevent the continuation of the rocking-free process after the vehicle is successfully released from the stuck situation despite any continued erroneous activation of the rocking-free process by a driver.

3. A method of releasing a vehicle from a stuck situation, the method comprising:
   recognizing the stuck situation of the vehicle by at least one sensor carried by the vehicle,
   initiating a rocking-free process upon recognition of the stuck situation of the vehicle;
   continuing the rocking-free process until the rocking-free process is automatically suppressed; and
   suppressing the rocking-free process after:
      a vehicle speed has fallen to approximately zero km/h.
      detecting, with at least one sensor, actuation of a throttle control of the vehicle;

evaluating actuation of the throttle control of the vehicle;

registering a minimum actuation of the throttle control of the vehicle is registered;

maintaining the vehicle speed for a predetermined time interval; and maintaining the minimum actuation of the throttle control for the predetermined time interval, detecting, with at least one sensor, actuation of a throttle control of the vehicle; and continuing suppression of the rocking-free process for a predetermined time interval in order to prevent the continuation of the rocking-free process after the vehicle is successfully released from the stuck situation despite any continued erroneous activation of the rocking-free process by a driver.

4. The method according to claim 3, further comprising noting and evaluating a minimum actuation of the throttle control of the vehicle.

5. The method according to claim 1, further comprising:
preventing erroneous operation of the motor vehicle by a driver when the rocking-free process was not actively terminated by:
  detecting a successful release of the motor vehicle from the stuck situation;
  implementing an automatic suppression of the rocking-free process on a basis of pre-established criteria; and
  preventing the continuation of the rocking-free process after the successful release is detected; and
only facilitating proper operation of the motor vehicle once the motor vehicle has been successfully released from the stuck situation.

6. The method according to claim 1, wherein the rocking-free process comprises:
first moving the motor vehicle in a desired travel direction;
reaching a reversal point at which a force equilibrium exists between a drive torque and a force opposing the drive torque;
moving the motor vehicle in an opposite direction to the desired travel direction until a second reversal point is reached at which the force equilibrium exists; and
moving the motor vehicle in the desired travel direction until a third reversal point is reached, the third reversal point being further away from a starting position than the first reversal point.

7. The method according to claim 1, wherein the step of recognizing the stuck situation of the motor vehicle by at least one sensor which comprises a respective sensor for each wheel of the motor vehicle;
evaluating a speed of each respective individual wheel of the motor vehicle by the respective sensor;
comparing the speed of each respective individual wheel with one another; and
detecting a wheel-slip of the motor vehicle.

8. The method according to claim 1, wherein the step of suppressing the rocking-free process occurs automatically when at least one predetermined, vehicle-specific condition arises, such that the rocking-free process is suppressed automatically by vehicle-internal processes after detecting activation of the throttle control of the motor vehicle which was inactive at the initiation of and during the rocking-free process, for the predetermined time interval.

* * * * *